No. 766,961. PATENTED AUG. 9, 1904.
C. W. MORRIS.
HOSE COUPLING.
APPLICATION FILED DEC. 14, 1903.
NO MODEL.
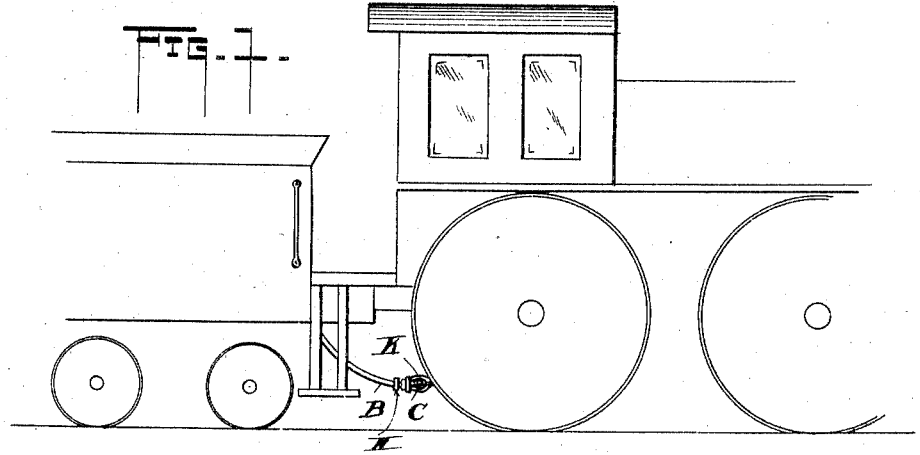
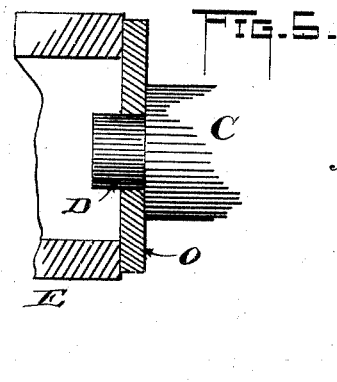
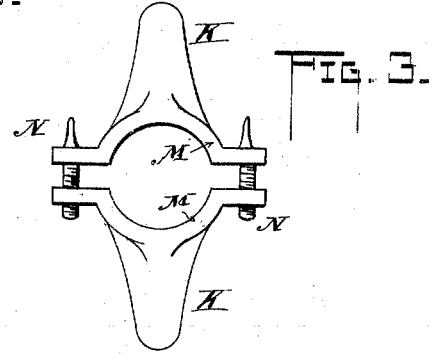
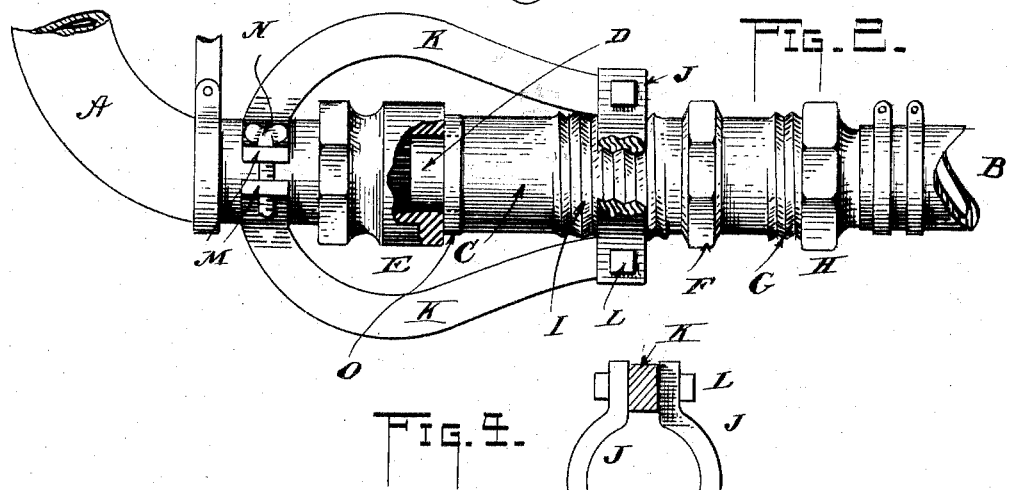
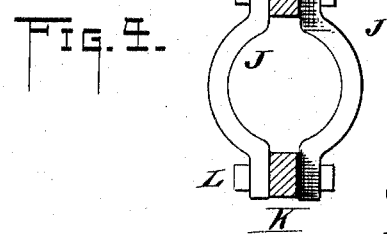
WITNESSES
Louis Neff
mae Davis.
INVENTOR
Charles W. Morris,
By L. N. Thurlow,
ATTY.

No. 766,961.

Patented August 9, 1904.

UNITED STATES PATENT OFFICE.

CHARLES W. MORRIS, OF PEORIA, ILLINOIS.

HOSE-COUPLING.

SPECIFICATION forming part of Letters Patent No. 766,961, dated August 9, 1904.

Application filed December 14, 1903. Serial No. 185,182. (No model.)

*To all whom it may concern:*

Be it known that I, CHARLES W. MORRIS, a citizen of the United States, residing at Peoria, in the county of Peoria and State of Illinois, have invented certain new and useful Improvements in Hose-Couplings; and I do hereby declare that the following is a full, clear, and exact description of the invention, which will enable others skilled in the art to which it appertains to make and use the same.

This invention relates to a new coupling means for use on hose-pipes and the like, but pertains more particularly to the hose connection between locomotives and their tenders and between railway-cars.

The object of the invention is to provide a new form of hose-coupling that will be equally adapted to any-sized fitting found on any pipe or hose, so that a connection can always be made without the least delay or unnecessary work.

In the accompanying drawings, Figure 1 is an elevation of a portion of a locomotive and its tender, showing a hose connection between the two as usually employed, showing my attachment thereon. Fig. 2 is a view of my entire coupling. Fig. 3 is an end view of a clamp thereof. Fig. 4 is a sectional view of the said clamp viewed the same as Fig. 3. Fig. 5 is a sectional view of a portion of a hose-fitting, showing my attachment thereto.

A indicates the supply-pipe connected to the engine, and B indicates the hose leading to the tender or cars. Between these two pipes my improved device is located and which consists of a reducer C, having at one end a projection D for entering the fitting E of the supply-pipe A. Near the opposite end of the portion C is a faced flange F for taking a wrench, and at the extreme end are screw-threads G, by which the reducer may be attached to a fitting H of the hose B. Also at about midway of the reducer are threads I, surrounded by a clip composed of the portions J, internally threaded to correspond. Between the extremities of said portions J are secured curved arms K by means of bolts L. Said arms K extend forward and each terminates in a clip portion M, clamped around the end of the pipe A by means of screws N.

In assembling the parts the reducer is connected into the fitting H of the hose B, and its reduced projection D is entered into the opening in the fitting E of the pipe. Then the clip ends M are placed over the pipe A and tightly clamped by the thumb-screws N. It is only necessary now to place a wrench upon the faced portion F, and by turning the same toward the right, as is customary, the entire portion C is worked through the threaded clip portions J, thereby tightly forcing the shoulder of the said portion C against the fitting E, the arms K and their clip portions having previously been placed on C in the manner described. It is necessary to provide some sort of swiveling connection, of course, to permit the portion C to be turned without loosening its connection with the hose-pipe, and this swivel may be within the fitting H; but I have not illustrated it, as it forms no part of my invention, but must of course be provided, as will be obvious.

The purpose of employing the reducer C between the fittings E and H, which fittings are usually connected together in common practice, is that these said fittings are rarely of a uniform size, it being often the case that one of them is either too large or too small to connect with the other, and often much time and annoyance results in finally finding some means by which they may be connected in a water-tight manner. Having found the disadvantage in such a construction, it has caused me to bring about the device herein described. The fitting H on the hose-pipe is usually of a fixed size, and therefore a reducer of a fixed size will always answer. However, the fitting E is variable in size, and consequently provision must be made for making connection therewith. I have shown in Figs. 2 and 5 a brass washer O interposed between the fitting E and the shoulder of C. This washer is variable in size—that is to say, a number of different sizes may be kept on hand, so that the desired connection can always be made. In Fig. 2 it so happens that the fitting E is of about the same size as the reducer, and the washer O would not be necessary, and I may not use said washer in such case, since the shoulder of C will make the required tight joint; but in Fig.

5 the fitting is much larger. Consequently a large washer is necessary. This closes the opening of said fitting, while a hole in said washer permits entrance of the reduced portion D. It will be seen that in both cases a closed and tight joint is made. A rubber gasket may also be used in connection with the washers O, if desired, to insure proper connection should any of the faces become injured in such a way as to allow leakage. By providing the arms K and their clamping means the reducer C may be brought up as tight as desired, so that a perfect union of the pipes must result. As a matter of fact I do not desire to confine myself to any particular construction in bringing out my device; but I have described and illustrated the form I prefer to use.

What I claim is—

1. A hose-pipe comprising the two portions to be connected, one of which is of a fixed size and the other of a variable size, a member interposed between the said portions to be connected, one end of said member being screwed into one of said portions, the opposite end being shouldered and having a reduced end merely entering the opposite portion, a gasket interposed between the shoulder of the member and the portion into which the member is inserted, and a clamping device rigidly secured to one of the portions and carrying screw-threads at the other into which the interposing member is adapted to be screwed substantially as described and shown.

2. A hose-coupling comprising two pipe portions to be connected, one of which is of a fixed size and the other of variable size, of a member interposed between the said portions to be connected, one end of said member adapted to screw into the pipe portion of fixed size, the other end adapted to be held in fixed relation to the other pipe portion, a washer interposed between the member and the pipe portion last above described, and means for screwing the member firmly against the pipe portion such means being independent of the immediately-adjoining surfaces or free ends of said member and pipe.

3. In a pipe-coupling of the character described, the two portions constituting the pipe to be connected, a member interposed between such portions one end thereof being secured as by screw-threads in one of the portions, the opposite end having abutting relation with the opposite pipe portion, and means for maintaining such relation which consists of a yoke member secured to the pipe portion last described, and extending past the abutting part and screw-threaded at the extremity thereof, said member being likewise screw-threaded to engage with said yoke.

4. In a coupling for hose-pipes, the pipes A and B, fittings E and H carried by the said pipes respectively, the member C interposed between said fittings, one end of said member adapted to screw into the fitting H, the opposite end of said member arranged to enter and abut against the fitting E substantially as shown, a clamp composed of the arms K having the clip members M thereon to clamp to the pipe A, the clip members J to which the arms K are connected, the said members J and the member C being threaded to correspond as described, said member C adapted to tightly abut against the fitting E by being screwed within the said clip members J as described.

5. In a coupling for hose-pipes, the combination of the pipes A and B, the fittings E and H therefor respectively, the member C interposed between the fittings, one end thereof being screwed into H, the opposite end engaging with E as described and shown, the washer O between the member and fitting E, the arms K secured to the pipe A, the clip members J carried by the arms K and internally threaded, the said member C being threaded at I to correspond with and engage the said member J all arranged substantially as herein described.

In testimony whereof I affix my signature in presence of two witnesses.

CHARLES W. MORRIS.

Witnesses:
C. B. McDougal,
Jno. H. Tammen.